United States Patent
Song et al.

(10) Patent No.: US 9,710,509 B2
(45) Date of Patent: Jul. 18, 2017

(54) IMAGE DECODING METHOD AND APPARATUS FOR BROWSER

(71) Applicant: Verizon Patent and Licensing Inc., Basking Ridge, NJ (US)

(72) Inventors: Qing Jian Song, Shanghai (CN); Yunlong Zhou, Shanghai (CN); Luigi Rosso, San Francisco, CA (US); Kevin Meier, Belmont, CA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/123,881

(22) PCT Filed: Jun. 26, 2013

(86) PCT No.: PCT/CN2013/078025
§ 371 (c)(1),
(2) Date: Dec. 4, 2013

(87) PCT Pub. No.: WO2014/205688
PCT Pub. Date: Dec. 31, 2014

(65) Prior Publication Data
US 2016/0124916 A1    May 5, 2016

(51) Int. Cl.
*G06F 17/30* (2006.01)
*G06F 9/44* (2006.01)
(Continued)

(52) U.S. Cl.
CPC ...... *G06F 17/30348* (2013.01); *G06F 9/4443* (2013.01); *G06F 9/5027* (2013.01);
(Continued)

(58) Field of Classification Search
CPC ............ G06F 17/2247; G06F 17/2252; G06F 17/30348
See application file for complete search history.

(56) References Cited

U.S. PATENT DOCUMENTS

2009/0110310 A1    4/2009  Kodama
2014/0053059 A1*   2/2014  Weber ................. G06F 9/45529
                                                    715/234

FOREIGN PATENT DOCUMENTS

CN    101067827    11/2007
CN    101539859    9/2009

OTHER PUBLICATIONS

Benoit Girard, "Off Main Thread Compositing (OMTC) and why it matters" found in https://benoitgirard.wordpress.com/2012/05/15/off-main-thread-compositing-omtc-and-why-it-matters/, May 15, 2012, Nenoit Girard's Blog, pp. 2 and 3.*

(Continued)

*Primary Examiner* — Scott Baderman
*Assistant Examiner* — Seung Jung

(57) ABSTRACT

Apparatuses, methods and storage medium associated with rendering a web page are disclosed herein. In embodiments, a method may include rendering, by a main thread of a browser, one or more non-image objects of the web page; decoding in parallel, by an image decoder of the browser, an image of the web page, while the main thread renders the one or more non-image objects of the web page. On completion of decoding the image, the main thread renders the decoded image. The web page may be part of a web application. Other embodiments may be described and claimed.

20 Claims, 5 Drawing Sheets

(51) Int. Cl.
*G06F 17/22* (2006.01)
*G06T 1/20* (2006.01)
*G06T 11/60* (2006.01)
*G06F 9/50* (2006.01)

(52) U.S. Cl.
CPC ...... *G06F 17/2247* (2013.01); *G06F 17/2252* (2013.01); *G06F 17/30008* (2013.01); *G06T 1/20* (2013.01); *G06T 11/60* (2013.01); *G06F 2209/509* (2013.01)

(56) References Cited

OTHER PUBLICATIONS

Brian Anderson, Design located in https://github.com/servo/servo/wiki/Design/c64739de924edf88d019c226d7795c68dd495c91, Dec. 21, 2012, Github Inc., pp. 1-5.*
Kogent Solution Inc., Java 6 Programming Black Book, Jun. 28, 2007, Dreamtech Press, New Ed., pp. 1034-1035.*
Kwang Yul Seo et al., Bug 90375—Parallel image decoders found in https://bugs.webkit.org/show_bug.cgi?id=90375, Aug. 2, 2012, Bugzilla.org, pp. 5-21.*
Vangelis Kokkevis, May 2012, GPU Accelerated Compositing in Chrome, The Chromium Projects, pp. 1-9.*
Benoit Girard, May 15, 2012, Off Main Thread Compositing (OMTC) and why it matters, Benoit Girard's Blog, pp. 1-7.*

* cited by examiner

IMAGE DECODING METHOD AND APPARATUS FOR BROWSER

CROSS REFERENCE TO RELATED APPLICATIONS

The present application is a national phase entry under 35 U.S.C. §371 of International Application No. PCT/CN2013/078025, filed Jun. 26, 2013, entitled "IMAGE DECODING METHOD AND APPARATUS FOR BROWSER," which designated, among the various States, the United States of America. The Specification of the PCT/CN2013/078025 Application is hereby incorporated by reference.

TECHNICAL FIELD

The present disclosure relates to the field of data processing, in particular, to apparatuses, methods and storage medium associated with a browser for rending web pages, having a parallel decoder for asynchronously decoding images of a web page.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in general purpose microprocessors, graphics processors, networking, and related technologies have led to an increase in availability of multi-media contents via the Internet. Increasingly, web based applications include rich and sophisticated interactive 2D/3D graphics and images in their web pages. Typically, prior art browsers decode and blend images into the output display of web pages inline. As images become more sophisticated requiring more computing cycles to decode, inline decoding of images may become a performance issue for various applications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
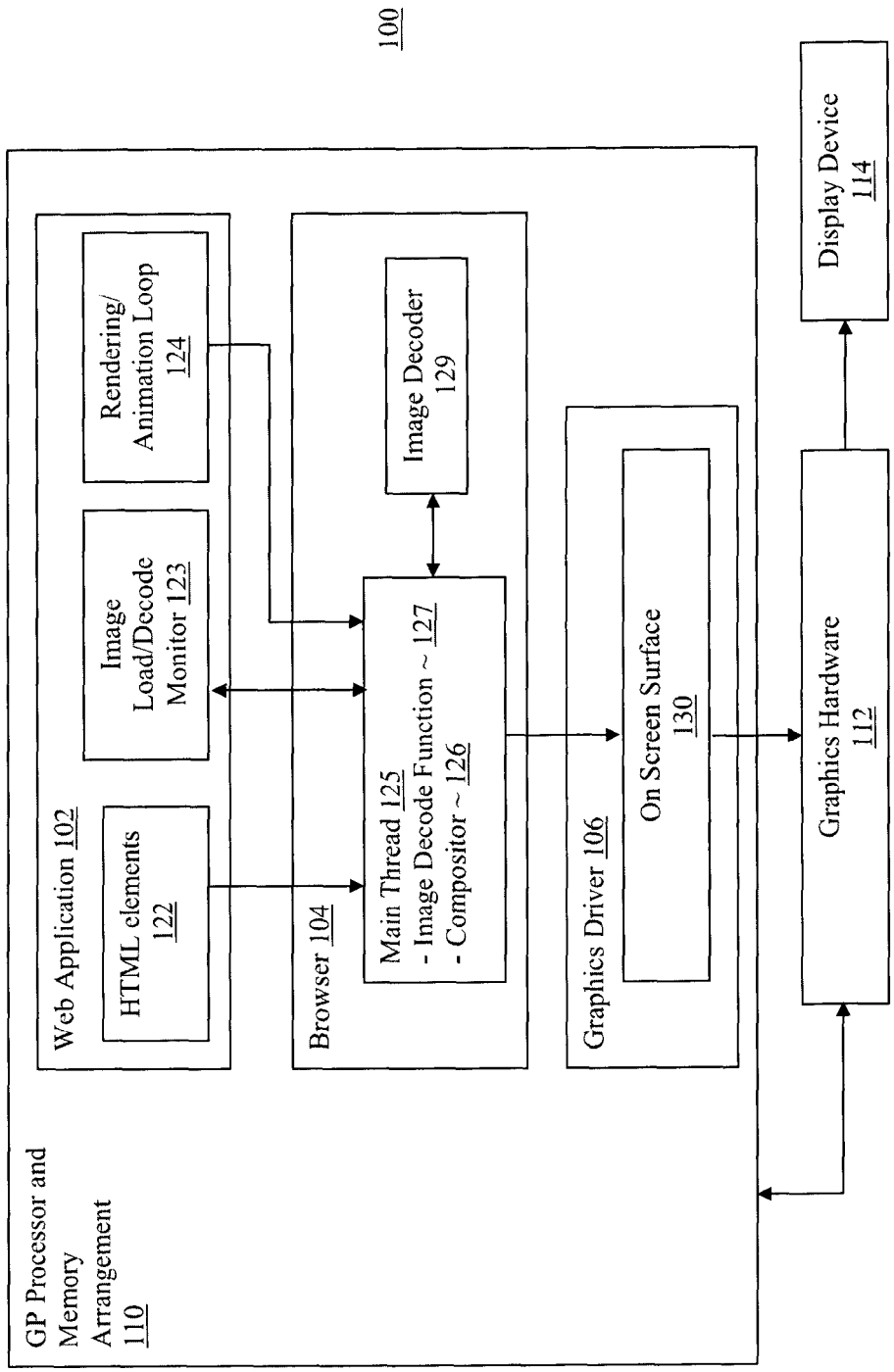
FIG. 1 illustrates a component view of a computing device with a browser and a web application incorporated with the teachings of the present disclosure, in accordance with various embodiments.

Apparatus, methods and storage medium associated with rendering a web page are disclosed herein. In embodiments, a method for rendering a web page of a web application may include rendering, by a main thread of a browser, one or more non-image objects or decoded image objects of the web page; decoding in parallel, by an image decoder of the browser, an image of the web page, while the main thread renders the one or more non-image objects or decoded image objects of the web page. On completion of decoding the image, the decoded image is added to a collection of objects to be rendered by the main thread.

In embodiments, the method may further include an image decode function of the main thread, on invocation by the web application to decode an image, cause the image decoder to asynchronously decode the image in parallel. On completion of the decoding of the image, the image decode function may notify a rendering/animation loop of the web application of the completion of the decoding of the image event. On notification of the completion of decoding of the image event, the rendering/animation loop may add the decoded image to the collection of objects to be rendered by the browser.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, a component view of a computing device with a browser and a web application incorporated with the teachings of the present disclosure, in accordance with various embodiments, is shown. As illustrated, in embodiments, computing device 100 may include general purpose (GP) processor and memory arrangement 110, graphics hardware 112, and display device 114, coupled with each other as shown. GP processor and memory arrangement 110 may be configured to host and execute web application 102 and browser 104, optionally, with the assistance of graphics hardware 112, via graphics driver 106. As will be described in more detail below, browser 104 may include main thread 125 and image decoder 129, with main thread 125 configured to render non-image objects and decoded image objects, and image decoder 129 configured to decode images to generate decoded images. In particular, main thread 125 and image decoder 129 may be complementarily configured to operate in parallel, enabling main thread 125 to continue to render non-image objects and decode image objects, while image decoder 129 asynchronously decodes images. As a result, performance of browser 104, and in turn, web application 102, may be improved, especially with increasingly complex and/or rich images that are computationally intense to decode.

In embodiments, main thread 125 may include image decode function 127 and compositor 126. Image decode function 127 may be configured for web application 102 to explicitly invoke, to have an image decoded asynchronously, as opposed to typical prior art having the image decoded inline by main thread 125 during rendering. To effectuate asynchronous decoding of an image, without holding up main thread 125 waiting for the completion of decoding, on invocation, image decode function 127 may post the decoding task to the parallel operating image decoder 129. In embodiments, image decode function 127 may also be configured to spawn image decoder 129 to operate in parallel with main thread 125, if image decoder 129 has not been instantiated, when image decode function 127 is invoked. In object oriented embodiments, image decode function 127 may be implemented as an image decode method.

Further, image decode function 127 may be configured to generate a decode completion event, on notification of completion of the decoding of an image by parallel image decoder 129, and forward the event to web application 102, e.g., to image load/decode monitor 123 of web application 102, to notify completion of decoding of an image. Web application 102, including image load/decode monitor 123 and other aspects, will be described below.

Compositor 126 may include various modules configured to perform the conventional functions of rendering video, image, 2D/3D graphics, and texts. Example embodiments of compositor 126 will be further described later, with references to FIG. 3. In embodiments, compositor 126 may be configured with enhanced support for WebGL graphics functions, as disclosed in PCT Application, Number PCT/CN2013/072610, filed Mar. 14, 2013, and titled "COMPOSITOR SUPPORT FOR GRAPHICS FUNCTIONS."

Image decoder 129 may be configured to decode images in a wide range of formats, including, but are not limited to, Joint Photographic Experts Group (JPEG), JPEG File Interchange Format (JFIF), Tagged Image File Format (TIFF), Raw Image Format (RAW), Graphics Interchange Format (GIF), Bitmaps, Portable Network Graphics (PNG), Portable Pixmap Format (PPM), Portable Graymap Format (PGM), Portable Bitmap Format (PBM), and so forth. Image decoder 129 may be configured with an associated task queue, to which decoding tasks may be posted. Further, image decoder 129 may be configured to notify the requester of a decoding task, on completion of the decoding task.

Web application 102 may include a number of web pages constructed with HTML elements 122, e.g., HTML5 elements. HTML elements 122 may include, but are not limited to, texts, graphics, images, and so forth. Some of the texts, graphics, images et al, may be loaded from an external network resource. Additionally, web application 102 may include rendering/animation loop 124 configured to process and sequence the texts, graphics, images et al objects, adding them to a collection for browser 104 to render. In embodiments, unlike the prior art, rendering/animation loop 124 may add image objects to the collection of objects to be rendered, after the image has been decoded. Further, rendering/animation loop 124 may calculate various rendering attributes, such as, positions, sizes, opacity, and so forth, for HTML elements 122. In embodiments, browser 104 may implement the document object model (DOM), and rendering/animation loop 124 may be configured to add the HTML elements 122, non-image objects and decoded image objects to the DOM tree of browser 104.

As shown, web application 102 may further include image load/decode monitor 123 (hereinafter simply, image monitor or monitor). In embodiments, monitor 123 may be configured to monitor for loading of images. Monitor 123 may be configured to invoke image decode function 127 to asynchronously decode an image, on detection of the image being loaded. Further, monitor 123 may be configured to monitor for an image decoding complete event, from image decode function 127, on invocation of image decode function 127 to asynchronously decode an image. Monitor 123 may also be configured to notify rendering/animation loop 124, on detection of the image decoding complete event.

Except for the teachings of the present disclosure, both web application 102 and browser 104 are respectively intended to be a broad range of web applications and browsers known in the art, including without limitation, web applications and browsers designed for mobile computing devices. In embodiments, browser 104 may include optionally, an interpreter, e.g., Javascript®, to support the operation of web application 102.

Graphics driver 106 may be configured to in turn operate graphics hardware 112 to render on screen surface 130, drawn by compositor 126, on display device 114. Graphics driver 106 and display device 114 are also intended to represent a broad range of these elements known in the art.

GP processor and memory arrangement 110 is intended to represent a broad range of GP processors and memory devices, including without limitations, arrangements designed for mobile computing. For examples, without limitations, GP processor may be any one of a number of single or multi-core processors known in the art. One or more processors may be used. Memory may be any one of a number of volatile and/or non-volatile memory known in the art including, but are not limited to, dynamic random access memory (DRAM), FLASH, and so forth. Similarly, one or more memory units may be used.

Graphics hardware 112 may be any one of a wide range of graphics processors known in the art, including without limitations, those designed for mobile computing. In embodiments, display device 114 may be touch screen displays. Further, computing device 100 may include other components, such as wired or wireless communication interfaces. An example of wired communication interfaces may include an Ethernet networking interface. Examples of wireless communication interfaces may include interfaces that support WiFi, 3G/4G wireless communications. Computing device 100 may also include mass storage devices, such as magnetic, optical and/or solid state mass storages, and/or input devices, such as keyboard or other cursor control and/or gesture recognition devices. Still further, computing device 100 may include camera, Global Position System (GPS) support, and various sensors. In other words, except for the incorporation of the teachings of the present disclosure, computing device 100 may be any one of a number of stationary or mobile "computing" devices known in art including, without limitation, set-top boxes, smartphones, tablets, ultrabooks, e-readers, laptop computers, desktop computers, and so forth.

Figure 2:
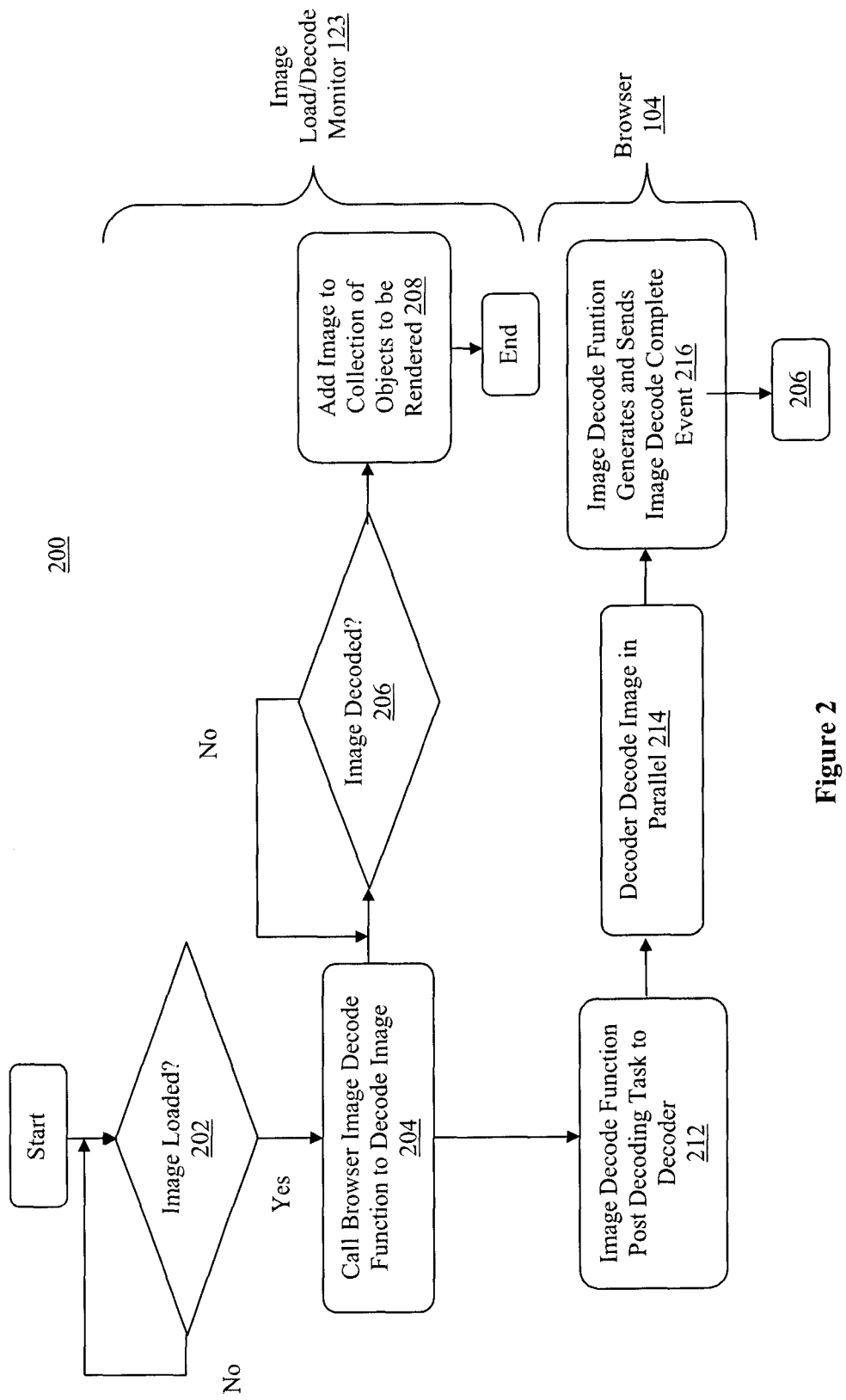
FIG. 2 illustrates the interactions between the browser and the web application of FIG. 1 in further detail, in accordance with various embodiments.

Referring now to FIG. 2, which illustrates an example process of interactions between the browser and the web application of FIG. 1 in further detail, in accordance with various embodiments. As illustrated, example process 200 may start at block 202. At block 202, image loading by web application 102 may be monitored, e.g., by image monitor 123. At block 204, on detection of loading of an image by web application 102, browser 104 may be called, e.g., by image monitor 123, to asynchronously decode the image. As described earlier, in embodiments, main thread 125 of browser 104 may include an image decode function 127. Browser 104 may be called to asynchronously decode the image, with monitor 123 calling image decode function 127.

On calling, process 200 may proceed to blocks 206 and 212. At block 206, completion of decoding of the image may be monitored, e.g., by image monitor 123. At block 212, an image decoding task may be posted to image decoder 129, e.g., by image decode function 127.

From block 212, process 200 may proceed to block 214. At block 214, the image may be decoded asynchronously, e.g., by image decoder 129 operating in parallel to main thread 125. From block 214, process 200 may proceed to block 216. At block 216, an image decode completion event may be generated and sent, e.g., by image decode function 127, to web application 102, e.g., to image monitor 123.

From block 216, process 200 may proceed back to block 206. Recall at block 206, completion of decoding of the image is being monitored. Thus, on receipt of the event of completion of decoding of the image, process 200 may proceed to block 208. At block 208, the decoded image may be added by web application 102 to the collection of objects to be rendered by browser 104. For example, rendering/animation loop 124 may add the decoded image to the collection, on notification by image monitor 123.

Figure 3:
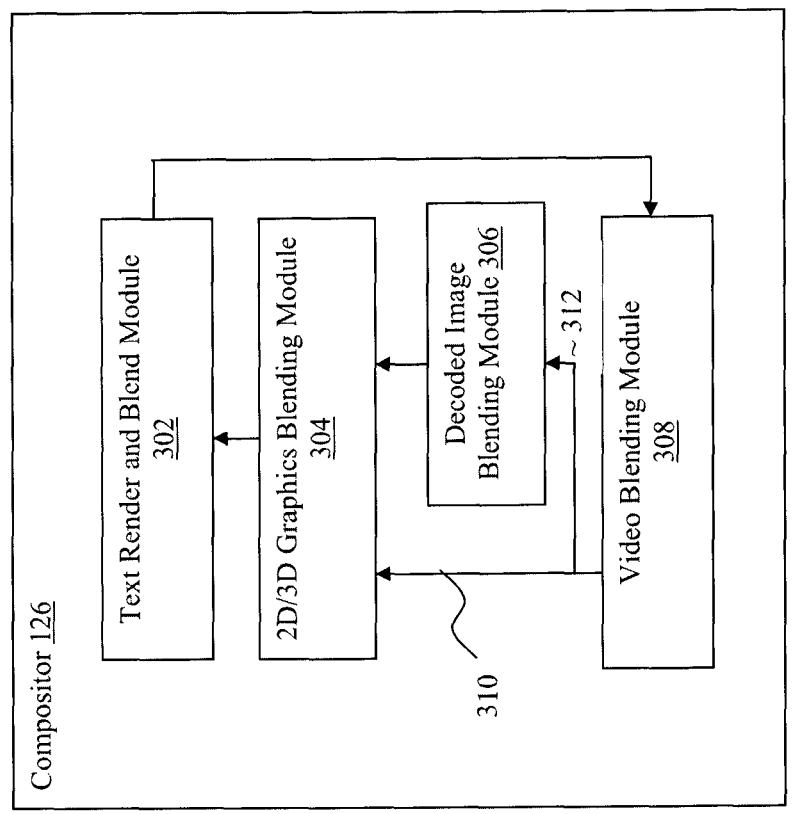
FIG. 3 illustrates the compositor of the browser of FIG. 1 in further detail, in accordance with various embodiments.

Referring now to FIG. 3, compositor 126 of browser 104 of FIG. 1 is illustrated with more detail, in accordance with various embodiments. As shown, for the embodiments, compositor 126 may include text render and blend module 302, 2D/3D graphics blend module 304, decoded image blend module 306, and video blend module 308, operatively coupled to each other as shown. In operation, for the embodiments, text render and blend module 302 may first render and blend text of the web page into the output display. Thereafter, text render and blend module 302 may transfer operation control to video blend module 308. On given operation control, video blend module 308 may blend video of the web page into the output display.

Unlike prior art where video blend module 308 typically transfers operation control to an image decode and blend module to decode and blend an image of the web page into the output display, video blend module 308 may conditionally transfer operation control to decoded image blend module 306 or 2D/3D graphics blend module 304. If asynchronous decoding of an image has completed, and there is at least one decoded image awaiting rendering, video blend module 308 may transfer operation control to decoded image blend module 306. If asynchronous decoding of an image has not completed, and there is no decoded image awaiting rendering, video blend module 308 may transfer operation control to 2D/3D graphics blend module 304 and continue operation.

Those skilled in the art will appreciate, with images increasingly becoming more complex and features rich, requiring more computation to decode, prior art browser will typically stall here, waiting for the decoding of an image to complete before being able to continue with other rendering and blending operation. Embodiments of the present disclosure however enables the browser to continue with other rendering and blending, while the image is being asynchronously decoded, thereby potentially improving performance of the browser, and in turn, the web application.

Still referring to FIG. 3, if given operational control, decoded image blend module 306 may proceed to blend the decoded image into the output display. On blending the decoded image, decoded image blend module 306 may transfer operation control to 2D/3D graphics blend module 304.

When given operation control, 2D/3D graphics blend module 304 may blend 2D/3D graphics into the output display. On blending the 2D/3D graphics, 2D/3D graphics blend module 304 may then transfer operation control to text rendering and blend module 302. From there, another iteration of operations of compositor 126 may start. The operations may be repeated until the entire web page is rendered into the output display.

Figure 4:
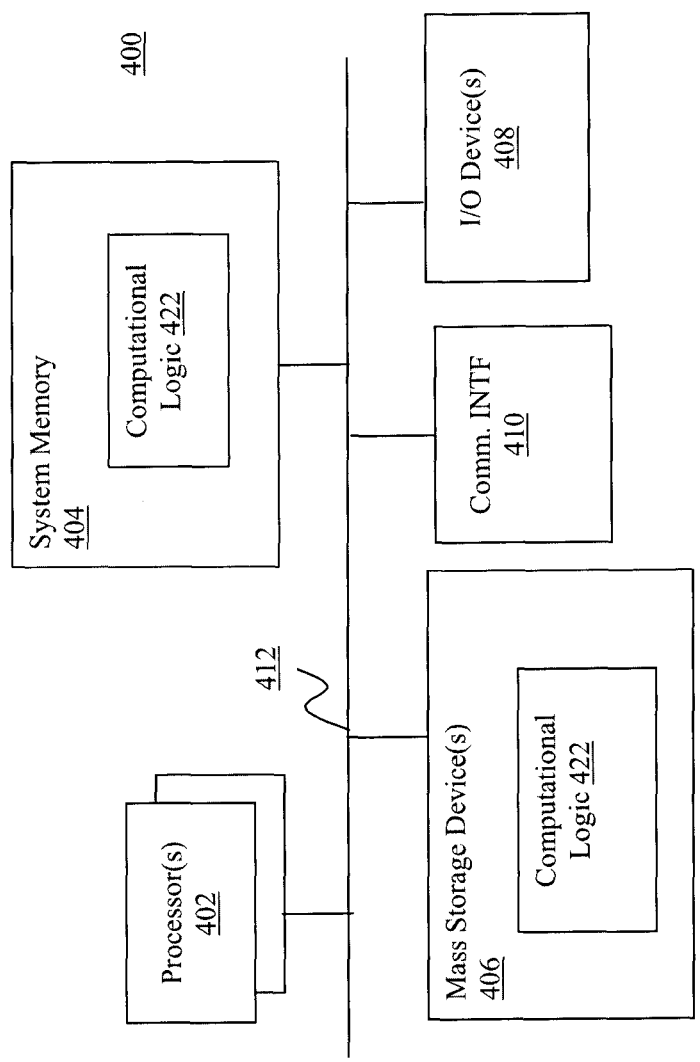
FIG. 4 illustrates an example computing environment suitable for practicing the disclosure, in accordance with various embodiments.

Referring now to FIG. 4, wherein an example computer suitable for use for the arrangement of FIG. 1, in accordance with various embodiments, is illustrated. As shown, computer 400 may include one or more processors or processor cores 402, and system memory 404. For the purpose of this application, including the claims, the terms "processor" and "processor cores" may be considered synonymous, unless the context clearly requires otherwise. Additionally, computer 400 may include mass storage device(s) 406 (such as diskette, hard drive, compact disc read only memory (CD-ROM) and so forth), input/output device(s) 408 (such as display, keyboard, cursor control and so forth) and communication interfaces 410 (such as network interface cards, modems and so forth). The elements may be coupled to each other via system bus 412, which may represent one or more buses. In the case of multiple buses, they may be bridged by one or more bus bridges (not shown).

Each of these elements may perform its conventional functions known in the art. In particular, system memory 404 and mass storage device(s) 406 may be employed to store a working copy and a permanent copy of the programming instructions implementing the operations associated with main thread 125, in particular, image decoding function 127, and image decoder 129 of browser 104, earlier described. In embodiments, a working copy and a permanent copy of the programming instructions implementing the operations associated with image load/decode monitor 123, as earlier described, may also be stored. The various elements may be implemented by assembler instructions supported by processor(s) 402 or high-level languages, such as, for example, C, that can be compiled into such instructions.

The permanent copy of the programming instructions may be placed into permanent mass storage device(s) 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The number, capability and/or capacity of these elements 410-412 may vary, depending on the intended use of example computer 400, e.g., whether example computer 400 is a stationary computing device like a set-top box or a desktop computer, or a mobile computing device, like a smartphone, tablet, ultabook or laptop. The constitutions of these elements 410-412 are otherwise known, and accordingly will not be further described.

Figure 5:
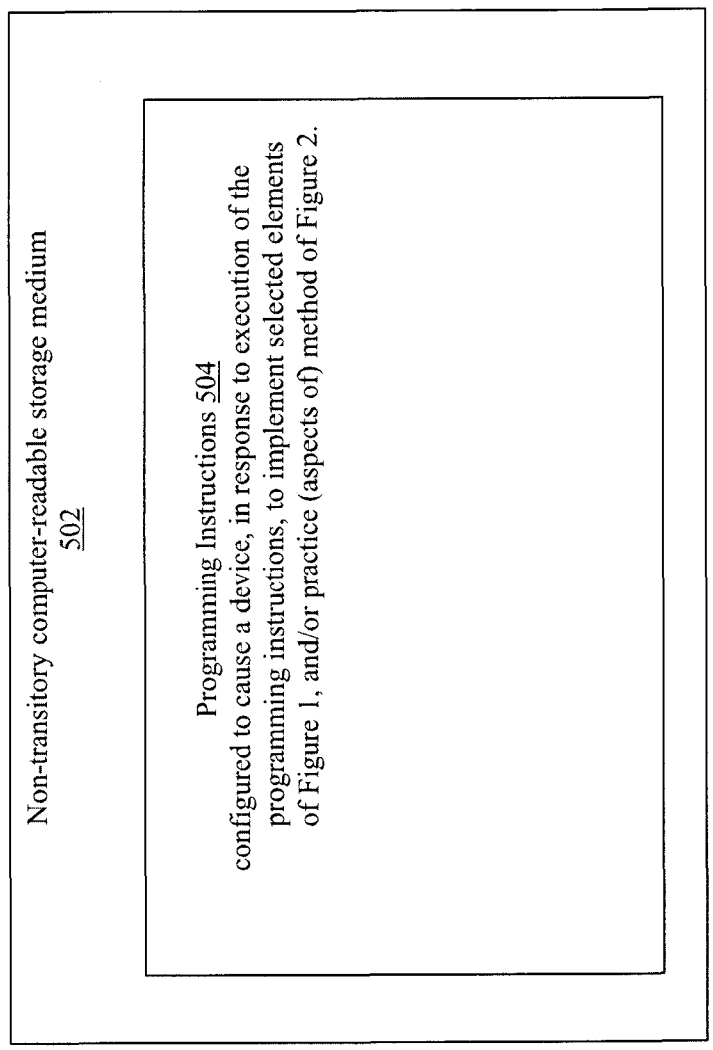
FIG. 5 illustrates an example storage medium with instructions configured to enable an apparatus to practice the present disclosure, in accordance with various embodiments.

FIG. 5 illustrates an example non-transitory computer-readable storage medium having instructions configured to practice all or selected ones of the operations associated with main thread 125, in particular, image decoding function 127, and image decoder 129 of browser 104, earlier described, in according with various embodiments. As illustrated, non-transitory computer-readable storage medium 502 may include a number of programming instructions 504. Programming instructions 504 may be configured to enable a device, e.g., computer 400, in response to execution of the programming instructions, to perform, e.g., various operations of process 200 of FIG. 2, e.g., but not limited to, the complementary operations performed by main thread 125 and image decoder 129 to asynchronously decode images of a web page, to enhance performance of browser 104, and in turn, web application 102. In embodiments, the operations may also include the operations associated with image load/decode monitor 123, as earlier described. In alternate embodiments, programming instructions 504 may be disposed on multiple non-transitory computer-readable storage medium 502 instead.

Referring back to FIG. 4, for one embodiment, at least one of processors 402 may be packaged together with computational logic 422 (in lieu of storing in memory 404 and/or mass storage 406) configured to practice aspects of the process of FIG. 2. For one embodiment, at least one of processors 402 may be packaged together with computational logic 422 configured to practice aspects of the process of FIG. 2 to form a System in Package (SiP). For one embodiment, at least one of processors 402 may be integrated on the same die with computational logic 422 configured to practice aspects of the process of FIG. 2. For one embodiment, at least one of processors 402 may be packaged together with computational logic 422 configured to practice aspects of the process of FIG. 2 to form a System on Chip (SoC). For at least one embodiment, the SoC may be utilized in, e.g., but not limited to, a computing tablet.

Thus, example embodiments described include, but are not limited to:

Example 1 may be a method for rendering a web page. The method may include rendering, by a main thread of a browser operating on a computing device, one or more non-image objects of the web page, wherein the web page is part of a web application operating at least in part on the computing device; and decoding in parallel, by an image decoder of the browser operating on the computing device, an image of the web page, while the main thread renders the one or more non-image objects of the web page. Further, the method may include on completion of decoding the image, rendering, by the main thread, the decoded image.

Example 2 may be the method of claim 1, further including receiving, by the main thread, from the web application, an invocation of an image decode function of the main thread to decode the image; and in response to the invocation, spawning the image decoder, by the image decode function, on the computing device, to operate in parallel to the main thread to decode the image.

Example 3 may be the method of example 2, further including on completion of the decoding of the image, notifying the image decode function of the completion of the decoding of the image, by the image decoder.

Example 4 may be the method of example 3, further including on notification of the completion of the decoding of the image, generating an image decoding completion event, by the image decode function, to notify the web application of the completion of the decoding of the image.

Example 5 may be any one of examples 2, 3 or 4, further including monitoring, by a monitor of the web application, for loading of the image by the web application; and on detection of the loading, sending the invocation of the image decode function, by the monitor, to the main thread of the browser.

Example 6 may be example 5, further including on sending the invocation, monitoring, by the monitor of the web application, for a generation of an image decoding completion event by the image decode function.

Example 7 may be any one of examples 2-6, further including monitoring, by a monitor of the web application, for a generation of an image decoding completion event by the image decode function; and on detection of the image decoding completion event, notifying a rendering/animation loop of the web application of completion of the decoding of the image.

Example 8 may be example 7, further including on notification of the completion of the decoding of the image, adding the decoded image, by the rendering/animation loop of the web application, to a collection of objects to be rendered by the main thread.

Example 9 may be any one of examples 1-8, wherein the one or more non-image objects are first one or more non-image objects, and the method further comprises on rendering the decoded image, rendering, by the main thread, second one or more non-image objects of the web page.

Example 10 may be an apparatus for rendering a web page. The apparatus may include a processor, and a browser. The browser may be configured to be operated by the processor, and includes a main thread and an image decoder. The main thread may be configured to render the web page, including non-image objects and decoded images of the web page, wherein the web page is part of a web application. The image decoder may be configured to decode images of the web page and generate the decoded images for the main thread. The main thread and the image decoder may be complementarily configured to operate in parallel, with the main thread continues to render non-image objects, while the image decoder decodes images of the web page.

Example 11 may be example 10, wherein the main thread comprises an image decode function configured to spawn the image decoder on the apparatus, on invocation, to operate in parallel to the main thread to decode the image.

Example 12 may be example 11, wherein the image decoder is configured to decode the image, and notify the image decode function of completion of the decode of the image, on completion of the decode of the image.

Example 13 may be example 12, wherein the image decode function is further configured to generate an image decoding completion event to notify the web application of the completion of the decode of the image, on notification of the completion of the decode of the image.

Example 14 may be any one of examples 11-13, further including the web application, and wherein the web application comprises a monitor configured to monitor for loading of the image by the web application; and on detection of the loading, send the invocation of the image decode function to the main thread of the browser.

Example 15 may be example 14, wherein the monitor is further configured to monitor for a generation of an image decoding completion event by the image decode function, on sending the invocation to invoke the image decode function.

Example 16 may be any one of examples 11-15, further including the web application, and wherein the web application comprises a rendering/animation loop and a monitor, wherein the monitor is configured to monitor for a generation of an image decoding completion event by the image decode function; and on detection of the image decoding completion event, notify the rendering/animation loop of completion of the decoding of the image.

Example 17, may be example 16, wherein the rendering/animation loop is configured to add the decoded image to a collection of objects to be rendered by the main thread, on notification of the completion of the decode of the image.

Example 18 may be any one of examples 10-17, wherein the apparatus is a selected one of a set-top box, a smartphone, a computing tablet, an ultrabook, a laptop computer, or a desktop computer.

Example 19 may be an apparatus for rendering a web page having means for performing any one of the methods of claims 1-9.

Example 20 may be at least one storage medium comprising a plurality of instructions configured to cause an apparatus, in response to execution of the instructions by the apparatus, to perform any one of the methods of claims 1-9.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A method for rendering a web page, comprising:
rendering, by a main thread of a browser operating on a computing device, one or more non-image objects of the web page, wherein the web page is part of a web application;
receiving, from the web application, an invocation of an image decode function of the main thread to decode an image of the web page;
forwarding an imaging decoding task to an image decoder of the browser;
decoding in parallel, by the image decoder of the browser operating on the computing device, the image of the web page, while the main thread renders the one or more non-image objects of the web page;
notifying, by the image decoder, the image decode function of the completion of the decoding of the image;
rendering, by the main thread, the decoded image, in response to receipt of the notification by the image decode function of the completion of the decoding of the image;
adding, by a compositor of the browser, the decoded image to the one or more non-image objects of the web page in response to the notification of the completion of the decoding of the image,
wherein the compositor comprises a text render module, a graphics blend module, a decoded image blend module and a video blend module, and
wherein the rendering one or more non-image objects comprises rendering, by the text render module, text of the web page for an output display;
transferring, by the text render module and after rendering the text, operational control to the video blend module;
transferring, by the video blend module, operational control to the decoded image blend module, in response to determining that at least one decoded image is awaiting rendering, or transferring, by the video blend module, operational control to the graphics blend module, in response to determining that no decoded image is awaiting rendering;
blending, by the decoded image blend module and in response to receiving operational control, the decoded image to the output display; and
blending, by the graphics blend module and in response to receiving operational control, two-dimensional or three-dimensional graphics to the output display.

2. The method of claim 1, further comprising:
in response to the invocation, spawning the image decoder, by the image decode function, on the computing device, to operate in parallel to the main thread to decode the image.

3. The method of claim 1, further comprising on notification of the completion of the decoding of the image, generating an image decoding completion event, by the image decode function, to notify the web application of the completion of the decoding of the image.

4. The method of claim 2, further comprising:
monitoring, by a monitor of the web application, for loading of the image by the web application; and
in response to detection of the loading, sending the invocation of the image decode function, by the monitor, to the main thread of the browser; and
in response to sending the invocation, monitoring, by the monitor of the web application, for a generation of an image decoding completion event by the image decode function.

5. The method of claim 2, further comprising:
monitoring, by a monitor of the web application, for a generation of an image decoding completion event by the image decode function;
on detection of the image decoding completion event, notifying a rendering/animation loop of the web application of completion of the decoding of the image; and
on notification of the completion of the decoding of the image, adding the decoded image, by the rendering/animation loop of the web application, to a collection of objects to be rendered by the main thread.

6. The method of claim 1, wherein the one or more non-image objects are first one or more non-image objects, and the method further comprises on rendering the decoded image, rendering, by the main thread, second one or more non-image objects of the web page.

7. An apparatus for rendering a web page, comprising:
a processor;
a display; and
a browser configured to be operated by the processor, wherein the browser includes:
a main thread comprising an image decode function, a compositor comprising a text render module, a graphics blend module, a decoded image blend module and a video blend module, and
an image decoder,
wherein the main thread is configured to invoke the image decode function associated with an image of the web page and to render the web page, including non-image objects of the web page and the image, wherein the web page is part of a web application,
wherein the image decoder is configured to:
receive an image decoding task from the image decode function to decode the image of the web page and generate the decoded image for the main thread, and
notify the image decode function of the completion of the decoding of the image,
wherein the main thread is configured to:
render the decoded image in response to receipt of the notification by the image decode function,
wherein the main thread and the image decoder are configured to operate in parallel, and wherein the main thread renders non-image objects while the image decoder decodes the image,
wherein the text render module is configured to:
render text of the web page and output the non-image objects to the display, and
transfer operational control to the video blend module after outputting the non-image objects,
wherein the video blend module is configured to:
transfer operational control to the decoded image blend module when decoding of an image has completed and at least one decoded image is awaiting rendering, and
transfer operational control to the graphics blend module when decoding of an image has not completed and no decoded image is awaiting rendering,
wherein the decoded image blend module is configured to blend the decoded image to the display, in response to receiving operational control, and
wherein the video blend module is configured to blend, two-dimensional or three-dimensional graphics to the display, in response to receiving operational control.

8. The apparatus of claim 7, wherein the image decode function is configured to spawn the image decoder on the apparatus, on invocation, to operate in parallel to the main thread to decode the image.

9. The apparatus of claim 7, wherein the image decode function is further configured to generate an image decoding completion event to notify the web application of the completion of the decoding of the image.

10. The apparatus of claim 8, further comprising the web application, and wherein the web application comprises a monitor configured to monitor for loading of the image by the web application; and
in response to detection of the loading, send the invocation of the image decode function to the main thread of the browser.

11. The apparatus of claim 10, wherein the monitor is further configured to monitor for a generation of an image decoding completion event by the image decode function, on sending the invocation to invoke the image decode function.

12. The apparatus of claim 8, further comprising the web application, and wherein the web application comprises a rendering/animation loop and a monitor, wherein the monitor is configured to monitor for a generation of an image decoding completion event by the image decode function; and in response to detection of the image decoding completion event, notify the rendering/animation loop of completion of the decoding of the image.

13. The apparatus of claim 12, wherein the rendering/animation loop is configured to add the decoded image to a collection of objects to be rendered by the main thread, on notification of the completion of the decoding of the image.

14. The apparatus of claim 7, wherein the apparatus comprises a set-top box, a smartphone, a computing tablet, a laptop computer, or a desktop computer.

15. At least one non-transitory computer-readable medium having stored thereon sequences of instructions which, when executed by at least one processor, cause the at least one processor to:
render, by a main thread of a browser operating on a computing device, one or more non-image objects of a web page, wherein the web page is part of a web application;
receive, from the web application, an invocation of an image decode function of the main thread to decode an image of the web page;
forward an imaging decoding task to an image decoder of the browser;
decode in parallel, by the image decoder of the browser operating on the computing device, the image of the web page, while the main thread renders the one or more non-image objects of the web page;
notify, by the image decoder, the image decode function of the completion of the decoding of the image;
render, by the main thread, the decoded image, in response to receipt of the notification by the image decode function of the completion of the decoding of the image;
add, by a compositor of the browser, the decoded image to the one or more non-image objects of the web page in response to the notification of the completion of the decoding of the image,
wherein the compositor comprises a text render module, a graphics blend module, a decoded image blend module and a video blend module, and
wherein when rendering one or more non-image objects, the instructions cause the at least one processor to render, by the text render module, text of the web page for an output display;
transfer, by the text render module and after rendering the text, operational control to the video blend module;
transfer, by the video blend module, operational control to the decoded image blend module, in response to determining that at least one decoded image is awaiting rendering, or transferring, by the video blend module, operational control to the graphics blend module, in response to determining that no decoded image is awaiting rendering;
blend, by the decoded image blend module and in response to receiving operational control, the decoded image to the output display; and
blend, by the graphics blend module and in response to receiving operational control, two-dimensional or three-dimensional graphics to the output display.

16. The at least one non-transitory computer-readable medium of claim 15, wherein the instructions further cause the at least one processor to:
in response to the invocation, spawn the image decoder, by the image decode function, on the computing device, to operate in parallel to the main thread to decode the image.

17. The at least one non-transitory computer-readable medium of claim 15, wherein the instructions further cause the at least one processor to:

on notification of the completion of the decoding of the image, generate an image decoding completion event, by the image decode function, to notify the web application of the completion of the decoding of the image.

18. The at least one non-transitory computer-readable medium of 15, wherein the instructions further cause the at least one processor to:

monitor, by a monitor of the web application, for loading of the image by the web application; and in response to detection of the loading, send the invocation of the image decode function, by the monitor, to the main thread of the browser; and in response to sending the invocation, monitor, by the monitor of the web application, for a generation of an image decoding completion event by the image decode function.

19. The at least one non-transitory computer-readable medium of 16, wherein the instructions further cause the at least one processor to:

monitor, by a monitor of the web application, for a generation of an image decoding completion event by the image decode function;

on detection of the image decoding completion event, notify a rendering/animation loop of the web application of completion of the decoding of the image; and on notification of the completion of the decoding of the image, add the decoded image, by the rendering/animation loop of the web application, to a collection of objects to be rendered by the main thread.

20. The least one non-transitory computer-readable medium of 15, wherein the one or more non-image objects are first one or more non-image objects and wherein the instructions further cause the at least one processor to:

on rendering the decoded image, render, by the main thread, second one or more non-image objects of the web page.

\* \* \* \* \*